United States Patent

Peters

[15] 3,639,254

[45] Feb. 1, 1972

[54] ALKALINE EARTH THIOGALLATE PHOSPHORS

[72] Inventor: Thomas E. Peters, Levittown, N.Y.

[73] Assignee: GTE Laboratories Incorporated

[22] Filed: July 1, 1969

[21] Appl. No.: 838,065

[52] U.S. Cl. ...................................252/301.4 S, 252/301.4 S
[51] Int. Cl. ............................................................C09k 1/12
[58] Field of Search ............................................252/301.4 S

[56] References Cited

UNITED STATES PATENTS 2,947,704 8/1960 Apple ..............................252/301.6 S
2,947,705 8/1960 Apple ..............................252/301.6 S Primary Examiner—Robert D. Edmonds

[57] ABSTRACT

A phosphor system consisting of alkaline earth and alkali metal thiogallates activated by europium, lead, or cerium. These phosphors are photoluminescent and cathodoluminescent and are suitable for use in fluorescent lamps or cathode-ray tube screens.

19 Claims, 1 Drawing Figure

ALKALINE EARTH THIOGALLATE PHOSPHORS

BACKGROUND OF THE INVENTION

1. Field of the Invention

This invention relates to fluorescent materials which emit light when exposed to ultraviolet or electron radiation. In particular it relates to the thiogallates of alkaline earth and alkali metal elements as activated by europium, lead, or cerium.

2. Description of the Prior Art

Luminescent materials comprising zinc, cadmium, and mercury thiogallates activated by copper are known. Europium, lead, and cerium have been used as activators in a variety of host systems (see "Some Aspects of the Luminescence of Solids," Kroger, Elsevier Publishing Co. Inc., 1948).

SUMMARY OF THE INVENTION

The phosphor compositions of the present invention consist of activated thiogallates of the alkaline earths, calcium, strontium and barium, and activated thiogallates of the alkali metals, sodium and potassium. The activators of the present invention are europium, lead, and cerium. The compositions of this new phosphor system may be represented by the general formulas $$R_{1-w}Ga_2S_4:A_w \quad \text{and} \quad M_{2-2w}Ga_2S_4:A_w$$

wherein R is at least one alkaline earth element selected from the group consisting of calcium, strontium or barium; M is at least one alkali metal selected from the group consisting of sodium or potassium; A is an activator chosen from the group consisting of europium and lead; and $w$ is a value selected to produce luminescence when the phosphor composition is exposed to incident radiation.

The alkaline earth thiogallate phosphors of the present invention are cathodoluminescent and photoluminescent and exhibit a wide range of emission colors varying over the visible spectrum, with individual emission color being dependent upon the particular selection of host and activator material and, in some cases, activator concentration. In the discussion herein of the alkaline earth thiogallate phosphors, all emission characteristics are assumed to be for cathode-ray excitation unless otherwise stated, but it should be noted that each phosphor's photoluminescent emission color is similar to its cathodoluminescent emission color.

The divalent europium-activated calcium, strontium, and barium thiogallates exhibit yellow, green, and blue-green emission, respectively. A preferred range of europium activator for these phosphors is $w$ equals 0.01 to 0.08 gram-atom per mole. The emission color of these phosphors does not vary substantially with the europium concentration. However, intermediate colors between yellow and blue-green are obtained by employing more than one alkaline earth in a single europium-activated thiogallate phosphor. For example, the phosphor $Sr_{0.37}Ca_{0.60}Ga_2S_4:Eu_{0.03}$ has a yellow-green emission which lies between the yellow emission of the calcium (only) phosphor and the green emission of the strontium (only) phosphor.

The europium-activated strontium thiogallate phosphor of the present invention is a suitable phosphor for the green component of a color television picture tube. For example, the phosphor $Sr_{0.98}Ga_2S_4:Eu_{0.2}$ when cathodically excited emits bright green light having an emission peak at about 535 nanometers. This phosphor has color coordinates of $x=0.272$, $y=0.685$ as depicted by the point $G_1$ in the chromaticity diagram of FIG. 1. FIG. 1 is a standard C.I.E. chromaticity diagram having color definitive $x$- and $y$-coordinates whereby color hue and degree of saturation may be designated. The points B and R on the diagram correspond respectively to coordinate positions of blue and red phosphors commonly employed in color television picture tubes. Point B ($x=0.153$, $y=0.045$ represents a blue emitting silver-activated zinc sulfide phosphor and point R ($x=0.665$, $y=0.335$) represents red-emitting europium-activated yttrium vanadate. As is well known, the area of the solid-lined triangle 30 made by joining points $G_1$, R and B is indicative of the gamut of colors which can be obtained from a color system having constituent phosphors with emissions that correspond to these points.

The point $G_2$ represents the color coordinate of a typical silver-activated zinc-cadmium sulfide ($x=0.253$, $y=0.552$), the green-emitting phosphor conventionally used in color TV picture. The area of the dashed-line triangle 31 indicates that the gamut of colors available from the color system employing the zinc-cadmium sulfide phosphor is substantially smaller than the gamut of colors available from the same color system in which the disclosed thiogallate phosphor is employed. The advantageous emission color of the europium-activated strontium thiogallate for use in color television tubes will thus be readily appreciated.

The lead-activated alkaline earth thiogallates, unlike their europium-activated counterparts, tend to significantly change emission color as the amount of the activator is changed. For example, the phosphor $Ca_{0.995}Ga_2S_4:Pb_{0.005}$ appears white and has an emission peak at about 510 nanometers whereas the phosphor $Ca_{0.92}Ga_2S_4:Pb_{0.08}$ appears yellow-orange in color and has an emission peak at about 530 nanometers. This is typical of the lead-activated alkaline earth thiogallates which tend to shift towards higher wavelength emissions as the amount of activator is increased.

When trivalent cerium is used to activate an alkaline earth thiogallate, the trivalent cerium cannot simply enter the crystal lattice in place of the divalent alkaline earth element. If no charge compensation is employed, it is believed that the resulting crystal lattices will have structural "vacancies" (a condition known as "vacancy compensation"). This "vacancy-compensated" phosphor can be represented by the notation $R_{1-3w}(\ )_w Ga_2S_4:Ce_{2w}$, wherein the empty parenthesis stands for the indicated vacancy. If desired, the cerium-activated alkaline earth thiogallate phosphors of this invention can be charge compensated with either a monovalent or a divalent element. When a monovalent element, for example, sodium, is used, a phosphor composition of the form $R_{1-2w}Na_w Ga_2S_4:Ce_w$ is produced. The preferred range of activator for this sodium-compensated phosphor is $w$ equals 0.01 to 0.12 gram-atom per mole. Potassium can also be used for monovalent charge compensation. When a divalent element, for example, zinc, is used it is believed that the gallium sites are affected and the composition $R_{1-w}Zn_w Ga_{2-w}S_4:Ce_w$ is formed.

The cerium-activated alkaline earth thiogallate phosphors of the present invention have a relatively short persistence; i.e., their luminescence persists for only a very short period of time (of the order of a microsecond) after an exciting stimulus is removed. This phenomena is believed to involve an allowed $^2D \rightarrow ^2F$ transition of the cerium ion. Short-persistence is one important requirement for phosphors used in a short-persistence cathode-ray tube known as a "flying-spot scanner" tube. A flying-spot scanner tube which employs the cerium-activated phosphors of the present invention is disclosed in my copending U.S. Pat. application Ser. No. 125,611 filed Mar. 18, 1971, which is a continuation-in-part of my U.S. Pat. application Ser. No. 838,170 filed July 1, 1969 and assigned to the same assignee as the present application.

The alkali metal thiogallate phosphors of the present invention exhibit a variety of emission colors when excited by ultraviolet or cathodic radiation. These phosphors are generally brightest under ultraviolet excitation and, accordingly, are useful in such applications as color correction and photocopying.

Europium-activated potassium thiogallate exhibits blue emission when irradiated with either ultraviolet or cathode rays, while the europium-activated sodium thiogallate has a yellow emission under these same modes of excitation. Intermediate emission colors are obtained when both sodium and potassium are incorporated in the phosphor. For example, the phosphor $(K_{1.84}Na_{0.16})_{0.99}Ga_2S_4:Eu_{0.01}$ has a bluish-green emission when excited by either ultraviolet or cathodic radiation. The preferred range of activator for the europium-activated alkali metal thiogallate phosphors is $w$ equals 0.00125 to 0.08 gram-atom per mole.

The lead-activated alkali metal thiogallates are moderately strong orange-emitting photoluminescent phosphors but emit weakly under cathode-ray excitation. These phosphors have very broad emission bands with peaks that shift to longer wavelengths as the activator concentration is increased.

The cerium-activated alkali metal thiogallates emit blue light when excited by either photoexcitation or cathode rays. Both the sodium and potassium phosphors have short-persistence characteristics but each is considerably less bright under cathode-ray excitation than the cerium-activated strontium-thiogallate.

EXAMPLES 1–12

The alkaline earth thiogallate compositions shown in Table I were made by dry-blending gallium sesquisulfide with the sulfides of an alkaline earth element and an activator element. The europium-activated and lead-activated compositions were made by firing the blend in a hydrogen sulfide ($H_2S$) atmosphere for about 2 hours at a temperature of approximately 1,000° C. and then allowing the blend to cool to room temperature in a nitrogen atmosphere. The cerium-activated compositions were made by firing the blend in an $H_2S$ atmosphere for about 2 hours at a temperature of approximately 950° C., allowing the blend to cool to room temperature in a nitrogen atmosphere, grinding the blend, refiring in $H_2S$ for about 1 hour at approximately 950° C. and then again cooling to room temperature in a nitrogen atmosphere. The resulting phosphors were excited by ultraviolet and cathodic radiation and each phosphor exhibited luminosity under both modes of excitation. Table I sets forth the observed color and approximate peak emission for each phosphor under cathode-ray excitation. The emission peaks under ultraviolet excitation (medium pressure mercury vapor lamp—"MPMV") were observed to be at about the same wavelengths.

EXAMPLE 13

Additional samples were prepared of each of the europium-activated alkaline earth thiogallate phosphor compositions of Examples 1–3 in which the europium concentration was varied between 0.01 and 0.08 gram-atom per mole. The phosphors obtained corresponded in observed color and emission wavelength peak to the phosphors of Examples 1–3.

EXAMPLE 14

Europium-activated alkaline earth thiogallate phosphors were prepared by the method of Examples 1–3 except that combinations of alkaline-earth elements were included in each phosphor. In a first sample 0.886 gram of strontium sulfide and 0.866 gram of calcium sulfide were blended with 4.71 grams of gallium sesquisulfide and 0.11 gram of europium sulfide. The resultant phosphor $Sr_{0.37}Ca_{0.60}Ga_2S_4:Eu_{0.03}$ was excited by ultraviolet (MPMV) and cathodic radiation and found to exhibit yellow-green emission peaking at about 547 nanometers under both modes of excitation. In a second sample 2.03 grams of barium sulfide were substituted for the calcium sulfide of the first sample. The resultant phosphor $Sr_{0.37}Ba_{0.60}Ga_2S_4:Eu_{0.03}$ emitted green radiation peaking at about 515 nanometers when excited by either cathodic or ultraviolet radiation.

EXAMPLES 15–19

Cerium-activated charge-compensated alkaline earth thiogallate compositions as shown in Table II were made in the same manner as the cerium-activated compositions of Examples 10–12 except for the addition of the indicated amount of the salt of the charge-compensating element to the original blend. The observed color and approximate peak emission for each phosphor under cathode-ray excitation are indicated in Table II.

TABLE II

| Example No. | $Ga_2S_3$ (grams) | Alkaline earth sulfide Reagent | Grams | Activator sulfide Reagent | Grams | Charge compensation Reagent | Grams | Product Composition | Observed color | Cathodoluminescent emission peak wavelength (nanometer) |
|---|---|---|---|---|---|---|---|---|---|---|
| 15 | 4.71 | CaS | 1.33 | $Ce_2S_3$ | 0.153 | NaCl | 0.047 | $Ca_{0.92}Na_{0.04}Ga_2S_4:Ce_{0.04}$ | Blue-green | 465 |
| 16 | 4.71 | SrS | 2.20 | Same | 0.153 | Same | 0.047 | $Sr_{0.92}Na_{0.04}Ga_2S_4:Ce_{0.04}$ | Blue | 455 |
| 17 | 4.71 | BaS | 3.12 | ...do | 0.153 | ...do | 0.047 | $Ba_{0.92}Na_{0.04}Ga_2S_4:Ce_{0.04}$ | ...do | 455 |
| 18 | 4.62 | SrS | 2.30 | ...do | 0.153 | ZnS | 0.078 | $Sr_{0.96}Zn_{0.04}Ga_{1.96}S_4:Ce_{0.04}$ | ...do | 460 |
| 19 | 4.71 | BaS | 2.85 | ...do | 0.303 | KF | 0.093 | $Ba_{0.84}K_{0.08}Ga_2S_4:Ce_{0.08}$ | ...do | 460 |

EXAMPLE 20

Additional samples were prepared of the cerium-activated sodium-compensated strontium thiogallate phosphor of Example 16 in which the europium concentration was varied between 0.01 and 0.12 gram-atom per mole. In each case a blue-emitting phosphor was obtained with the emission becoming slightly greenish as the cerium concentration increases.

EXAMPLES 21–26

The alkali metal thiogallate compositions shown in Table III were made by dry-blending gallium sesquisulfide with the car-

TABLE I

| Example No. | $Ga_2S_3$ (grams) | Alkaline earth sulfide Reagent | Grams | Activator sulfide Reagent | Grams | Product composition | Observed color | Cathodoluminescent emission peak wavelength (nanometers) |
|---|---|---|---|---|---|---|---|---|
| 1 | 4.71 | CaS | 1.41 | EuS | 0.074 | $Ca_{0.98}Ga_2S_4:Eu_{0.02}$ | Yellow | 555 |
| 2 | 4.71 | SrS | 2.34 | EuS | 0.074 | $Sr_{0.98}Ga_2S_4:Eu_{0.02}$ | Green | 535 |
| 3 | 4.71 | BaS | 3.32 | EuS | 0.074 | $Ba_{0.98}Ga_2S_4:Eu_{0.02}$ | Blue-green | 500 |
| 4 | 4.71 | CaS | 1.44 | PbS | 0.024 | $Ca_{0.995}Ga_2S_4:Pb_{0.005}$ | White | 510 |
| 5 | 4.71 | SrS | 2.38 | PbS | 0.024 | $Sr_{0.995}Ga_2S_4:Pb_{0.005}$ | ...do | 510 |
| 6 | 4.71 | BaS | 3.37 | PbS | 0.024 | $Ba_{0.995}Ga_2S_4:Pb_{0.005}$ | Blue | 435 |
| 7 | 4.71 | CaS | 1.33 | PbS | 0.383 | $Ca_{0.92}Ga_2S_4:Pb_{0.08}$ | Yellow-orange | 530 |
| 8 | 4.71 | SrS | 2.20 | PbS | 0.383 | $Sr_{0.92}Ga_2S_4:Pb_{0.08}$ | ...do | 530 |
| 9 | 4.71 | BaS | 3.12 | PbS | 0.383 | $Ba_{0.92}Ga_2S_4:Pb_{0.08}$ | Red | [1] 440, 590 |
| 10 | 4.70 | CaS | 1.38 | $Ce_2S_3$ | 0.153 | $Ca_{0.94}()_{0.02}GaS_4:Ce_{0.04}$ | Blue-green | 465 |
| 11 | 4.71 | SrS | 2.30 | $Ce_2S_3$ | 0.153 | $Sr_{0.94}()_{0.02}Ga_2S_4:Ce_{0.04}$ | Blue | 455 |
| 12 | 4.71 | BaS | 3.25 | $Ce_2S_3$ | 0.153 | $Ba_{0.94}()_{0.02}Ga_2S_4:Ce_{0.04}$ | ...do | 455 |

[1] Two emission bands.

bonate of an alkali metal element and the sulfide of an activator element. The blend was fired in a hydrogen sulfide atmosphere at a temperature of approximately 800° C. for 1 hour and then at 900° C. for an additional hour. The blend was then allowed to cool to room temperature in a nitrogen atmosphere. The resulting phosphors were excited by ultraviolet and cathodic radiation and each phosphor exhibited luminosity under both modes of excitation. Table III sets forth the observed color and peak emission wavelength for each phosphor when excited by ultraviolet radiation from an MPMV source.

TABLE III

| Example No.: | $Ga_2S_3$ (grams) | Alkali metal salt | | Activator sulfide | | Product composition | Observed color | Photoluminescent emission peak wavelength (nanometers) |
| --- | --- | --- | --- | --- | --- | --- | --- | --- |
| | | Reagent | Grams | Reagent | Grams | | | |
| 21 | 4.71 | $K_2CO_3$ | 2.75 | EuS | 0.037 | $K_{1.98}Ga_2S_4:Eu_{0.01}$ | Blue | 485 |
| 22 | 4.71 | $Na_2CO_3$ | 2.04 | EuS | 0.147 | $Na_{1.96}Ga_2S_4:Eu_{0.02}$ | Yellow | 550 |
| 23 | 4.71 | $K_2CO_3$ | 2.75 | PbS | 0.024 | $K_{1.99}Ga_2S_4:Pb_{0.005}$ | Orange | 592 |
| 24 | 4.71 | $Na_2CO_3$ | 2.035 | PbS | 0.191 | $Na_{1.92}Ga_2S_4:Pb_{0.04}$ | do | 585 |
| 25 | 4.71 | $K_2CO_3$ | 2.74 | $Ce_2S_3$ | 0.038 | $K_{1.97}Ga_2S_4:Ce_{0.01}$ | Blue | 435 |
| 26 | 4.71 | $Na_2CO_2$ | 1.865 | $Ce_2S_3$ | 0.306 | $Na_{1.76}Ga_2S_4:Ce_{0.08}$ | do | 470 |

EXAMPLE 27

Additional samples were prepared of the europium-activated sodium and potassium thiogallate phosphor compositions of Examples 21 and 22 in which the europium concentration was varied between 0.00125 and 0.08 gram-atom per mole. The phosphors obtained corresponded in observed color and approximate emission peak to the phosphors of Examples 21 and 22.

EXAMPLE 28

A europium-activated alkali metal thiogallate phosphor composition was prepared by the method of Examples 21–26 except that a combination of alkali metal elements were included in each phosphor. In a first sample 2.51 grams of potassium carbonate and 0.158 gram of sodium carbonate were blended with 4.71 grams of gallium sesquisulfide and 0.037 gram of europium sulfide. The resultant phosphor $(K_{1.84}Na_{0.16})Ga_2S_4:Eu_{0.01}$ was excited by ultraviolet (MPMV) radiation and found to exhibit blue-green emission having two peaks at about 495 and 518 nanometers. In a second sample, 2.71 grams of potassium carbonate and 0.02 gram of sodium carbonate were blended with 4.71 grams of gallium sesquisulfide and 0.037 gram of europium sulfide. The resultant phosphor $(K_{1.98}Na_{0.02})_{0.99}Ga_2S_4:Eu_{0.01}$ exhibited blue-green emission somewhat bluer than the first sample when excited by ultraviolet radiation.

What is claimed is:

1. A phosphor composition selected from the group consisting of $R_{1-w}Ga_2S_4:A_w$ and $M_{2-2w}Ga_2S_4:A_w$ where R is at least one alkaline earth element selected from the group consisting of calcium, strontium and barium, M is at least one alkali metal element selected from the group consisting of sodium and potassium, A is a divalent activator selected from the group consisting of europium and lead, and $w$ is a value greater than zero selected to produce luminescence when said phosphor composition is exposed to incident radiation.

2. A phosphor composition defined by the formula $R_{1-w}Ga_2S_4:A_w$ where R is at least one alkaline earth element selected from the group consisting of calcium, strontium and barium, A is a divalent activator selected from the group consisting of europium and lead, and $w$ is a value greater than zero selected to produce luminescence when said phosphor composition is exposed to incident radiation.

3. The phosphor composition as defined by claim 2 wherein A is europium and $w$ has the approximate range 0.01 to 0.08 gram-atom per mole.

4. The phosphor composition as defined by claim 3 wherein R is strontium.

5. The phosphor composition as defined by claim 4 wherein $w$ is about 0.02 gram-atom per mole.

6. A phosphor composition consisting essentially of an alkaline earth thiogallate activated by trivalent cerium, the ratio of alkaline earth sulfide to gallium sesquisulfide in said phosphor composition being about 1:1, said alkaline earth being selected from the group consisting of calcium, strontium, and barium.

7. The phosphor composition as defined by claim 6 wherein said alkaline earth is strontium.

8. A phosphor composition consisting essentially of a charge-compensated alkaline earth thiogallate activated by trivalent cerium, the ratio of alkaline earth sulfide to gallium sesquisulfide in said phosphor composition being about 1:1, said alkaline earth being selected from the group consisting of calcium, barium, and strontium.

9. The phosphor composition as defined by claim 8 wherein said trivalent cerium is charge compensated by sodium.

10. The phosphor composition as defined by claim 8 wherein said trivalent cerium is charge compensated by zinc.

11. The phosphor composition as defined by claim 8 wherein said trivalent cerium is charge compensated by potassium.

12. The phosphor as defined by claim 8 wherein said alkaline earth is strontium.

13. A phosphor composition as defined by the formula $Sr_{1-2w}NaGa_2S_4:Ce_w$ wherein $w$ has the approximate range 0.01 to 0.12 gram-atom per mole.

14. The phosphor composition as defined by claim 13 wherein $w$ is about 0.04 gram-atom per mole.

15. A phosphor composition as defined by the formula $M_{2-2w}GaS_4:A_w$ wherein M is at least one alkali metal element selected from the group consisting of sodium and potassium, A is a divalent activator selected from the group consisting of europium and lead, and $w$ is a value greater than zero selected to produce luminescence when said phosphor composition is exposed to incident radiation.

16. The phosphor composition as defined by claim 15 wherein A is europium and $w$ has the approximate range 0.00125 to 0.08 gram-atom per mole.

17. The phosphor composition as defined by claim 16 wherein M is sodium and $w$ is about 0.02 gram-atom per mole.

18. The phosphor composition as defined by claim 16 wherein M is potassium and $w$ is about 0.01 gram-atom per mole.

19. A phosphor composition consisting essentially of an alkali metal thiogallate activated by trivalent cerium, the ratio of alkali metal sulfide to gallium sesquisulfide being about 1:1, said alkali metal being selected from the group consisting of sodium and potassium.

* * * * *